W. S. ROGERS.
HANGER BOX.
APPLICATION FILED OCT. 12, 1911.
1,078,696.
Patented Nov. 18, 1913.
2 SHEETS—SHEET 1.
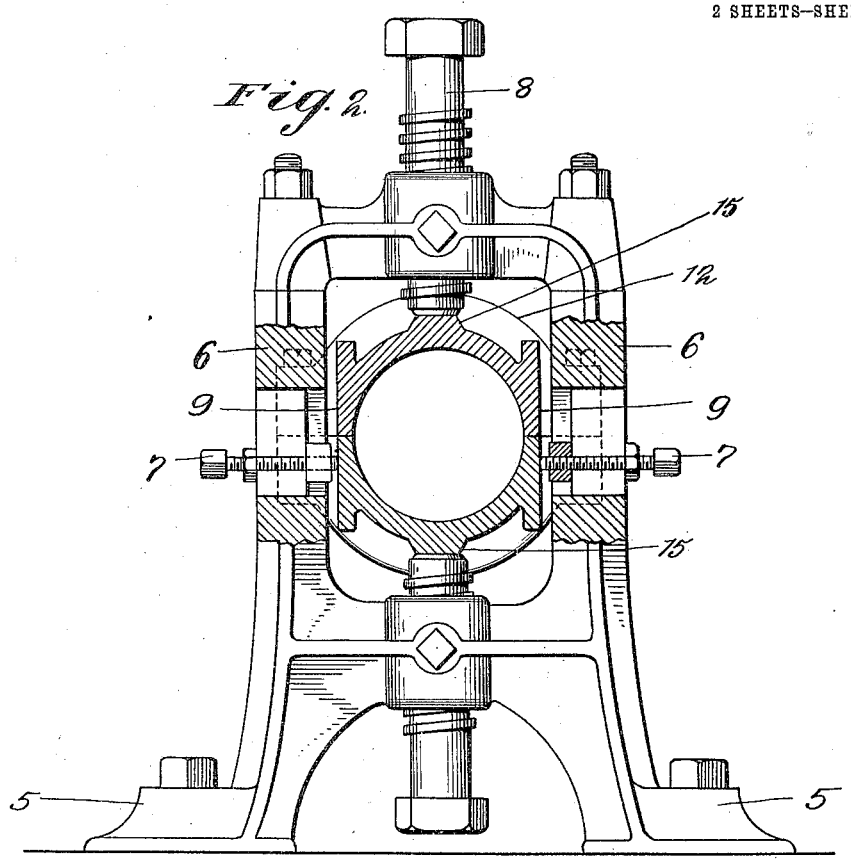
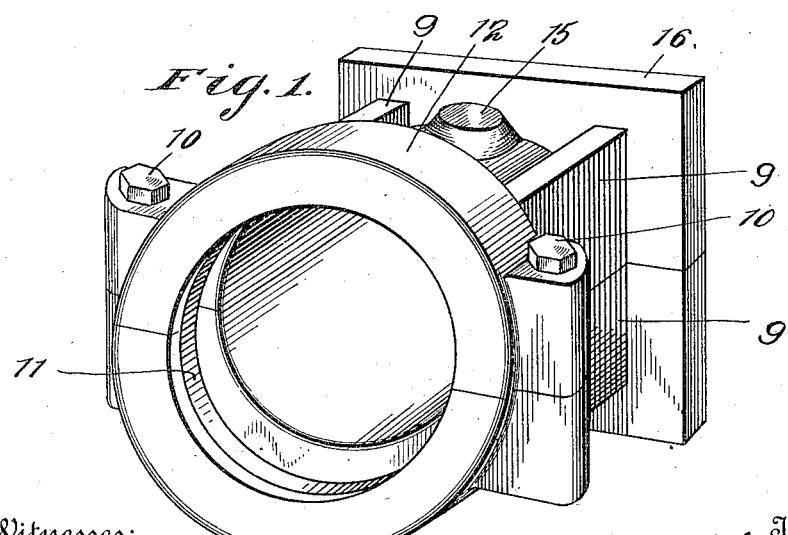

W. S. ROGERS.
HANGER BOX.
APPLICATION FILED OCT. 12, 1911.

1,078,696.

Patented Nov. 18, 1913.

2 SHEETS—SHEET 2.

Witnesses:

Inventor
Winfield S. Rogers
By his Attorney

UNITED STATES PATENT OFFICE.

WINFIELD S. ROGERS, OF BANTAM, CONNECTICUT.

HANGER-BOX.

1,078,696.

Specification of Letters Patent.

Patented Nov. 18, 1913.

Application filed October 12, 1911. Serial No. 654,417.

*To all whom it may concern:*

Be it known that I, WINFIELD S. ROGERS, a citizen of the United States, residing in the town of Bantam, county of Litchfield, and State of Connecticut, have invented certain new and useful Improvements in Hanger-Boxes, of which the following is a full, clear, and exact specification.

This invention relates to hanger boxes or bearing boxes for mounting bearing rings in hangers.

This improvement enables the use in a standard hanger of a bearing ring of larger external diameter than the distance between the uprights or stanchions of the hanger, a box for the ball bearing ring of large external radius capable of use in the standard hanger; a rigidly supported bearing box, having a bearing seat for permitting the shaft and ring to oscillate upon a fixed axis, and a rigidly mounted bearing box having within it an oscillatory bearing ring.

Figure 3:
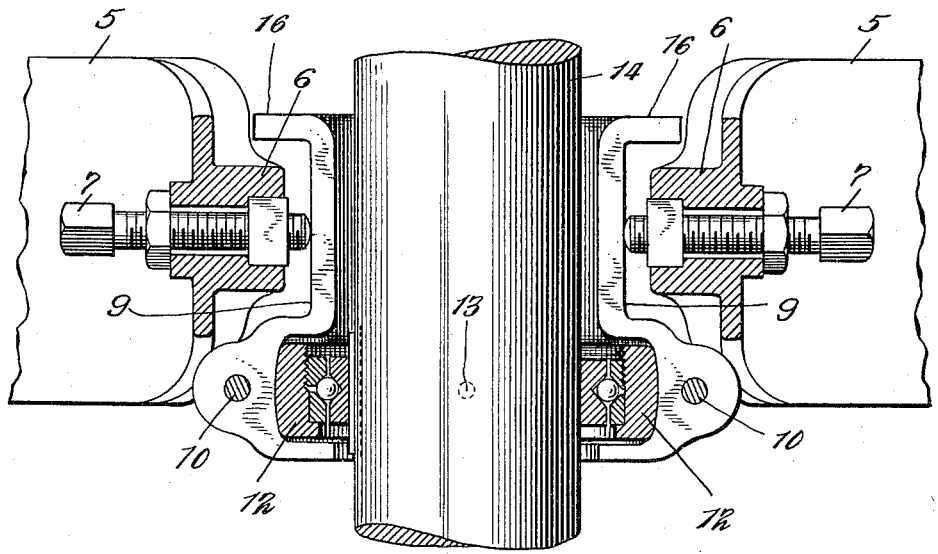
Figure 4:
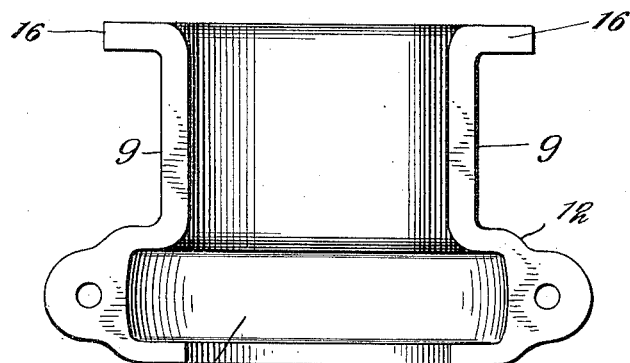

In the drawings accompanying and forming a part of this specification, Figure 1 is a perspective view illustrating one practical embodiment of a form of my improved hanger box. Fig. 2 is a view, partly elevational and partly sectional, of a form of my improved hanger box mounted in a standard hanger. Fig. 3 is a horizontal section through Fig. 2 on an enlarged scale, and Fig. 4 is a top plan view of one of the halves of the hanger box.

The standard hanger affords room for the hanger box for the Babbitt metal bushing, but the side members or stanchions are not wide enough apart to admit the use of a ball bearing. The present improvement, however, provides an outrigger for supporting the ball bearing in the existing form of hanger. This will enable the use of ball bearings and the improved hanger box in connection with installed shaftings and hangers.

In the drawings there is illustrated the standard hanger which is shown comprising feet 5 which will be lagged to ceiling or floor as occasion may demand, a pair of side members or stanchions 6 in each of which there is shown a clamping device 7 for engaging the sides of the hanger box, and at the top and bottom clamping devices 8 for engaging the top and bottom of the box.

The approved method of mounting shafting in the standard hanger is to support a box upon the clamping members 7 and 8 in such manner that it will oscillate about two axes determined by the clamping screws 7 and the clamping screws 8. Babbitt metal will then be run into the hanger box to form a bushing in which the shaft may rotate. The oscillations of the shaft will be compensated for by the oscillations of the box upon its pivotal supports. In this form of mounting the shaft the box is oscillatorily mounted in the hanger. According to my present improvement however, the bearing box will be securely clamped in the hanger, and the shaft and bearing ring will oscillate in the box.

The box in the present illustration is shown as comprising two halves, one half of which is illustrated in Fig. 4. The box is shown having a reduced central portion 9 which will pass between the side members or stanchions 6 and be clamped in position. The two halves of the box are shown connected by means of the bolts 10.

The bearing ring seat 11 is somewhat in the nature of an outrigger for supporting the outer casing or bearing ring 12 of a ball bearing device. The ball bearing device although illustrated in detail will be some device suitable for the purpose and may be some standard bearing if desired. It will be noted that the diameter of the casing 12 or ring, is greater than is the distance between the standards 6. The point 13 is supposed to be a point upon the axis of the shaft and from this as a center the curvature of the outside of the ring 12 and the inside of the ring 11 is struck.

When it is desired to mount the shaft 14 in the existing standard hanger, the ball bearing device with its outer ring 12 will be mounted in position upon the shaft, the halves of the box will be placed in position upon the ring and in the hanger, the portions of the box will be clamped together by means of the screws 10, and the vertical and lateral adjustment will be effected by means of the clamping devices 7 and 8, clamping device 7 engaging the sides of the reduced portion 9 and the clamping members 8 engaging bosses 15. Thus it will be seen that the hanger box is rigidly secured in the hanger and that oscillations due to vibrations or unevenness of the shaft rotation will be compensated for by the spherical outer face of the ring 12 moving in the spherical inner face of the seat 11.

For preventing the displacement of the box when the clamping devices are unfastened a flange 16 may be provided at the end of the box opposite the end carrying the outrigger for the seat 11.

The invention has been described in its connection and relation to the standard form of hanger to show its adaptability to present installations but of course it is apparent that other forms of hanger may be used as occasion may demand without departing from the spirit of my invention.

Having thus described my invention what I claim and desire to secure by Letters Patent is:

1. The combination with a shafting hanger, of a removable bearing box having a portion rigidly secured in said hanger, and an outrigged portion having a substantially spherical concave seat for oscillatorily supporting a shaft bearing ring, said concave seat lying wholly at one side of said hanger, the outrigged portion being of greater diameter than the portion secured in said hanger.

2. A bearing box having a tubular portion adapted to surround the shaft and having an outwardly extending flange at one end thereof and a channeled end portion of greater diameter than said bracket portion at the other end thereof, the bottom of said channel being concaved to form a substantially spherical seat for a bearing ring.

3. A bearing box longitudinally divided into halves, each of which comprises a sleeve portion having flat side walls and an outwardly extending flange at one end thereof and an outwardly extending ring portion at the other end thereof, said ring portion having an interior channel therein concaved to form a substantially spherical seat for an oscillating bearing.

4. A longitudinally divided bearing box comprising two sections adapted to be secured together and formed to thereby provide a cylindrical bore, each section being enlarged at one end so that when the two sections are joined, said enlarged portions will register, the bore formed by said enlarged portions being of substantially spherical contour and greater in diameter than the main bore of the bearing box, each side of the bearing box having shoulders formed thereon and the box having bosses located on its upper and lower outer surfaces, said bosses and said shoulders being adapted to be engaged by means to rigidly secure said bearing box within a hanger.

5. A longitudinally divided bearing box comprising two sections adapted to be secured together, said sections comprising supporting bracket portions adapted to register to form a tubular bore and enlarged portions at one end of said bracket portions, said enlarged portions each having a semicircular concave channel in the inner surface thereof, said channel portions registering to form a substantially spherical concave bearing ring seat of greater diameter than the diameter of the bore of the remainder of the bearing box.

In witness whereof I have hereunto set my hand in the presence of two subscribing witnesses.

WINFIELD S. ROGERS.

Witnesses:
CHAS. LYON RUSSELL,
WM. C. DUNN.

---

Copies of this patent may be obtained for five cents each, by addressing the "Commissioner of Patents, Washington, D. C."